US00RE34814E

United States Patent [19]

Magaldi

[11] E Patent Number: Re. 34,814

[45] Reissued Date of Patent: Jan. 3, 1995

[54] PROCESS AND APPARATUS FOR CONTINUOUS DRY REMOVAL OF BOTTOM ASH

[76] Inventor: Mario Magaldi, Viale del Bosco 22, 1-84100 Salerno, Italy

[21] Appl. No.: 851,381

[22] PCT Filed: Jan. 8, 1987

[86] PCT No.: PCT/EP87/00012

§ 371 Date: Jan. 10, 1986

§ 102(e) Date: Jan. 10, 1986

[87] PCT Pub. No.: WO87/04231

PCT Pub. Date: Jul. 16, 1987

Related U.S. Patent Documents

Reissue of:

[64] Patent No.: 4,887,539
Issued: Dec. 19, 1989
Appl. No.: 120,493
Filed: Jan. 8, 1987

[30] Foreign Application Priority Data

Jan. 10, 1986 [IT] Italy ..... 19052 A/86

[51] Int. Cl.[6] ..... F23J 1/00

[52] U.S. Cl. ..... 110/165 R; 414/327; 198/850; 110/259

[58] Field of Search ..... 110/165 A, 165 R, 259, 110/266; 198/850, 813, 851, 808, 809, 806, 804; 414/288, 304, 305, 306, 325, 327

[56] References Cited

U.S. PATENT DOCUMENTS

| | | | |
|---|---|---|---|
| 1,354,553 | 10/1920 | Harter . | |
| 1,452,952 | 4/1923 | Barnhurst . | |
| 1,506,803 | 9/1924 | Astrom . | |
| 1,739,497 | 12/1929 | Beach | 198/850 |
| 2,380,264 | 7/1945 | Richardson | 198/53 |
| 2,488,689 | 11/1949 | Smith et al. | 110/165 A |
| 2,558,626 | 6/1951 | Pfau | 110/165 |
| 2,702,485 | 2/1955 | Nadherny | 74/242 |
| 3,633,737 | 1/1972 | Magaldi | 198/196 |
| 3,802,584 | 4/1974 | Sacket, Sr. et al. | 214/44 R |
| 3,841,241 | 10/1974 | Dewey et al. | 110/8 R |
| 4,020,956 | 5/1977 | Van Hille | 214/17 |
| 4,112,856 | 9/1978 | Fuhrman et al. | 110/165 |
| 4,284,192 | 8/1981 | Taylor | 198/813 |
| 4,325,478 | 4/1982 | Richard | 198/699 |
| 4,395,958 | 8/1983 | Caffyn et al. | 110/246 |
| 4,432,772 | 2/1984 | Starke et al. | 48/66 |
| 4,628,828 | 12/1986 | Holtham et al. | 110/165 |

FOREIGN PATENT DOCUMENTS

| | | |
|---|---|---|
| 252967 | 8/1989 | European Pat. Off. . |
| 670342 | 11/1929 | France . |
| 63-6319 | 1/1988 | Japan . |
| 63-311016 | 12/1988 | Japan . |
| 275496 | 8/1927 | United Kingdom . |
| 756046 | 8/1956 | United Kingdom . |
| 985817 | 3/1965 | United Kingdom . |
| 1357276 | 6/1974 | United Kingdom . |

*Primary Examiner*—Henry C. Yuen
*Attorney, Agent, or Firm*—Foley & Lardner

[57] ABSTRACT

Provided is a process to continuously dry remove ash from the bottom of steam boilers by discharging the ash on a high temperature resistant conveyer which is enclosed in a tight sealed envelope. Also is provided an apparatus for accomplishing this which has a steel conveyer belt constructed to withstand high temperatures and enclosed in a sealed steel box connected to the bottom of the boiler so that the conveyer continuously receives and discharges ash from the boiler.

9 Claims, 5 Drawing Sheets

(SEC. Z-Z)

PROCESS AND APPARATUS FOR CONTINUOUS DRY REMOVAL OF BOTTOM ASH

Matter enclosed in heavy brackets [ ] appears in the original patent but forms no part of this reissue specification; matter printed in italics indicates the additions made by reissue.

The present invention relates to a process for continuous dry removal of bottom ash as well as to the relevant apparatus for carrying out said process.

Coal used in steam production [contain] *contains* inert matter in a percentage varying from 8 to 20% by weight.

In the steam producing boilers of thermoelectric power plants, fed with solid fuels, the combustion produces an ash residue of two fractions, namely fly ash carried by smoke and mainly picked up by the electrostatic filters provided for protecting the environment and bottom ash gathering on the boiler bottom, which must be removed.

Bottom ash contents [is of] *are* about 20% [on] *of* the total ash amount and they have a granule size from 0.03 to 300 mm while in the biggest pieces they may have a temperature up to 1200° C.

A percentage of unburnt coal *in the ashes*, varying from 4 to 16% according to the design and age of the boiler, must be removed with the ash.

The presently used boilers at their bottom have a water tank adapted to cool ash so as to allow the required removal with mechanical or hydraulic systems and also to give tightness so as to prevent false air [to enter] *from entering* the boiler.

The mixture consisting of water, ash and unburnt coal is sent to a plant for separating and recovering water, while the dry residue, not having an economical industrial use, is sent to *a* dump and creates considerable environmental problems.

The present invention removes these drawbacks and provides for a dry removal of bottom ash, being based on the novel principle of using a conveyor belt to remove said ash. In order to carry out this system it was therefore necessary to study a particular conveyor belt, adapted to withstand high temperature and provided with means adapted to confer tightness around the boiler bottom.

These problems are perfectly solved by the continuous dry removal apparatus of the present invention, consisting of a [steal] *steel* belt conveyor made so as to withstand high temperatures, inserted in a tight steel box, which is applied to the boiler bottom so that the conveyor belt contained in the box, receives and removes continuously said ash.

The steel belt conveyor is made so as to withstand mechanical stress due to ash impact and thermal stress due to burner radiation and high temperature of the removed ash.

In said belt the load bearing function and the driving function are assigned to two different but joined elements; the load bearing function to a set of steel plates suitably shaped and partially overlapped so as to form a continuous trough; and the driving function to a net-like wired belt made of high tensile steel. Each plate is individually fixed to the belt by a set of rivets or bolts which are connected with crosspieces inserted in the links of said belt.

This system allows free expansion of the plates in every direction according to temperature variations in order to avoid permanent set.

The steel wired belt is friction actuated by a cylindrical driving drum and it is stretched by a jockey drum on which a tensioning system is acting.

The driving system, based on friction and tension, allows [that also] the wired belt [may] *to* have free expansion in any direction avoiding permanent set.

Therefore the values of resistances to high temperature of this system are equal to the values of heat resistance of the type of alloy steel used. Refractory steel with high chrome and nickel contents are normally used, but other alloys may be used as well.

Tension induced in the belt by the tensioning system acting on the jockey drum[,] causes a pressure between plates in their overlapping areas, such a pressure between plates for the whole belt length prevents passage [even] of *even* the smallest particles.

The load bearing run of the belt is supported by smooth rollers while the return run is supported by cast iron or steel wheels.

Roller shafts protrude outside the container box, so that they can be supported by bearings arranged in a cool area. Between the shafts and the corresponding holes made in the box there are heat resistant seals preventing air entrance and gas passage, but allowing a sliding movement of the shafts due to expansion.

A cyclically operated valve limiting or preventing entrance of cool air, may be applied downstream the area of ash discharge from the apparatus.

In vacuum operated boilers, a quantity of air controlled by the above system may be delivered countercurrently to the direction of ash discharge. In this way the heat yielded to air by ash and by the combustion of the unburnt matter on the belt, is brought again into the boiler so as to increase its efficiency.

The above indicated system has a number of advantages which are hereinafter briefly enumerated:

(a) Removal and conveyance of ash even of big size without requiring prior crushing.

(b) Energy recovery from the unburnt coal portion.

(c) Industrial employ of dry ash not degraded by water and free from unburnt matter.

(d) Simplicity and reliability of the system built so as to avoid sudden halts.

(e) Energy saving in view of the low installed power in comparison with other systems.

(f) Reduction of areas required for the plant.

(g) Elimination of water transport and treatment systems.

(h) Reduction of installation and maintenance costs.

The process and apparatus being the subject matter of the present invention will be better understood from the following detailed description of a preferred embodiment, given only as a non limiting example of its scope, reference being had to the accompanying illustrative drawings, in which.

Figure 1:
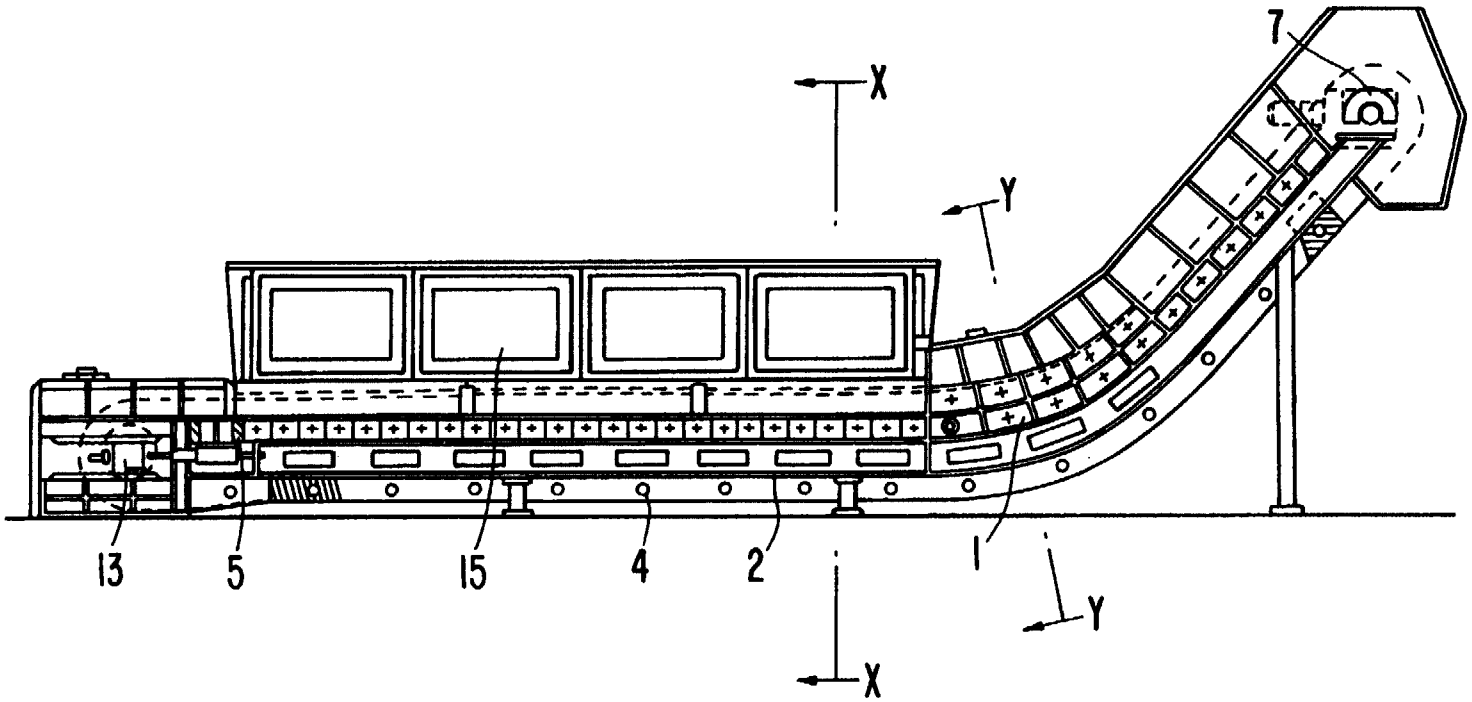
FIG. 1 is a lateral general view of an embodiment of the apparatus according to the present invention.

With reference now to the various figures of the accompanying drawings, as already stated the apparatus substantially comprises a steel conveyor belt consisting of a plurality of steel plates 1 suitably shaped and partially overlapping so as to form a continuous trough. Each plate 1 is provided with lateral boards 11 and some plates have also transverse dams 12 for dividing the trough into sections, so as to avoid [that] *a condition in which* the material slides back in the inclined stretches. Thus these plates 1 have the load bearing function, while the driving function is effected by a high strength steel wired belt 2. Each plate 1 is individually fixed to belt 2 by bolts 8 with relevant nut 10, which however may be replaced by rivets or other equivalent fastners, which are connected to crosspieces 9 suitably inserted in the links of said wired belt 2. This open system allows free expansion of plates 1 in any direction when temperature changes, so as to avoid permanent set.

The steel wired belt 2 is friction actuated by a cylindrical driving drum 7 and it is tensioned by a jockey drum 13 on which a tensioning device is acting, said device being not illustrated in greater detail as it is well known in the conveyor technique. This driving system, based on friction and tension, *also* allows [that also] the wired belt 2 [way] *to* undergo free expansion in any direction, so as to avoid permanent set.

The load bearing run of the belt is supported by smooth rollers 3, while the lower return run is supported by cast iron or steel wheels 4. Shafts 14 of smooth rollers 3 protrude outside a steel containing box 15, which is applied at the boiler bottom, so that ash is falling on the conveyor belt enclosed therein and said shafts 14 may be supported outside the hot environment by bearings 16, thus arranged in a cool area and supported by specially designed supports 5. Between shafts 14 and the corresponding holes 17 made in the box 15, there are heat resistant seals 6, preventing air entrance and gas passage, but allowing shafts 14 to slide because of expansion. A guide and adjustment pin 18 protrudes from a hole made in support 5 and provided with a sealing gasket 19.

Figure 2:
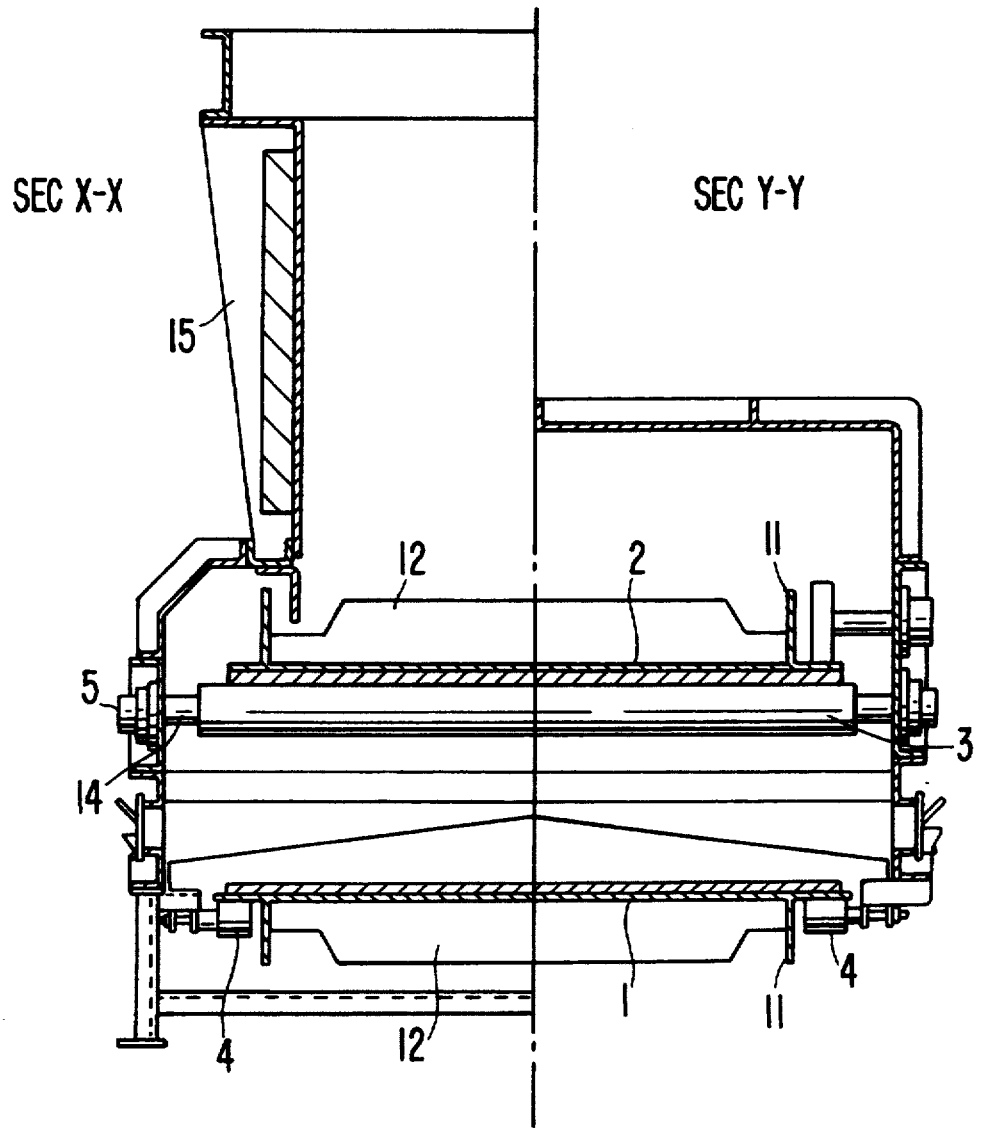
FIG. 2 is a vertical sectional view of the apparatus, taken in the left-hand portion along line X—X and in the right-hand portion along line Y—Y of FIG. 1.
Figure 3:
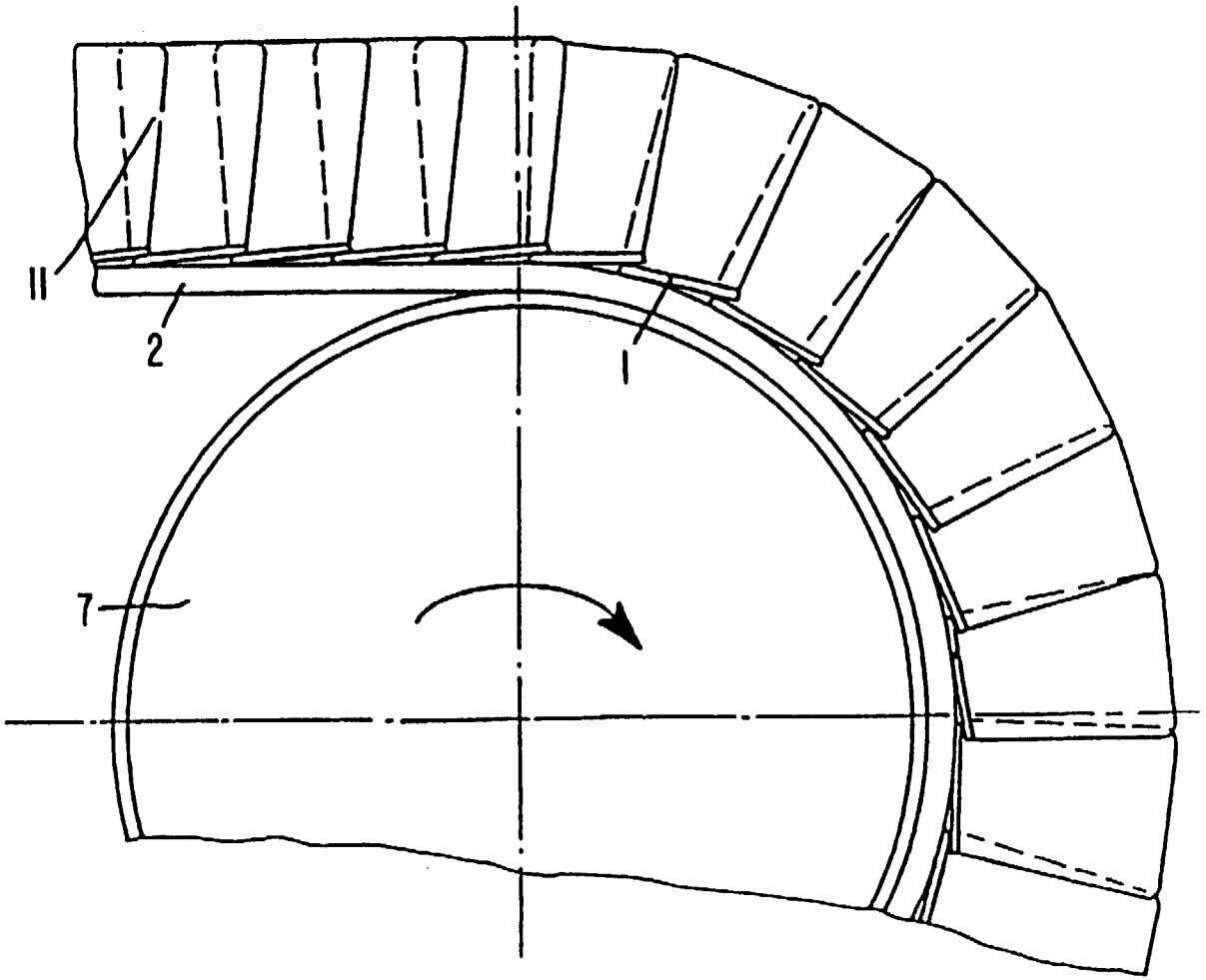
FIG. 3 is a detailed view of the passage of the conveyor belt on the driving drum.
Figure 5:
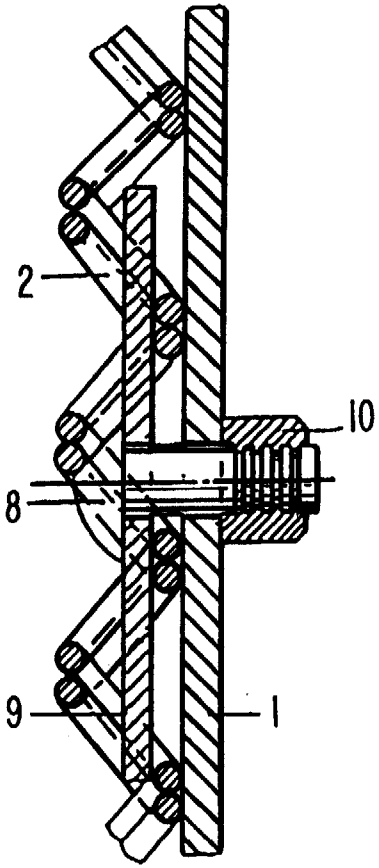
FIG. 5 is a sectional view taken along line Z—Z of FIG. 4, showing the structure of the conveyor belt.
Figure 4:
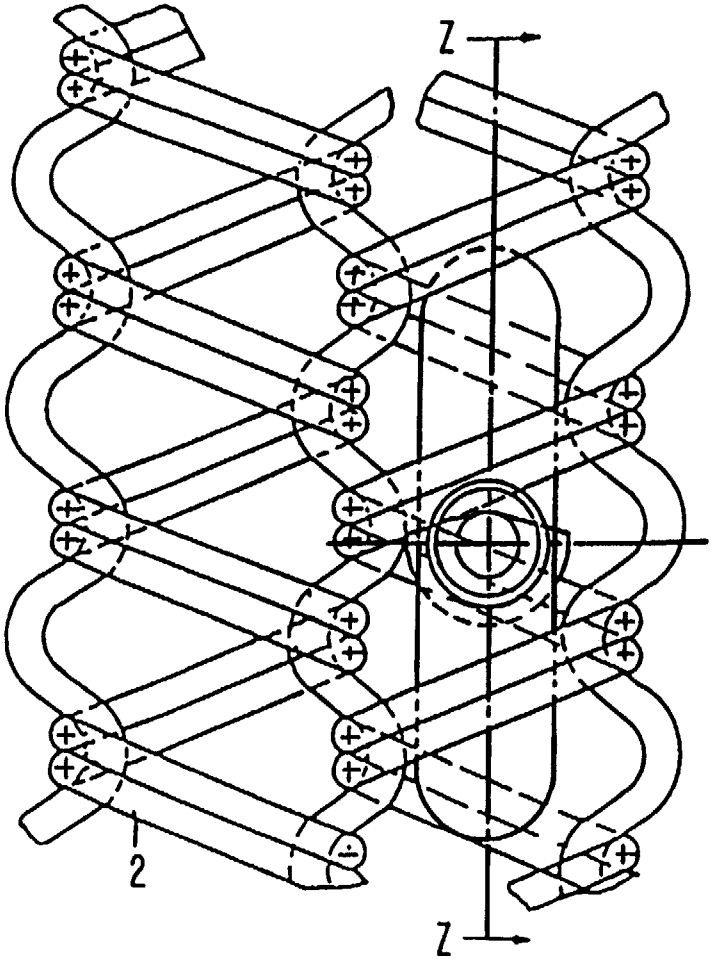
FIG. 4 is a detailed bottom view of a portion of the conveyor belt.
Figure 6:
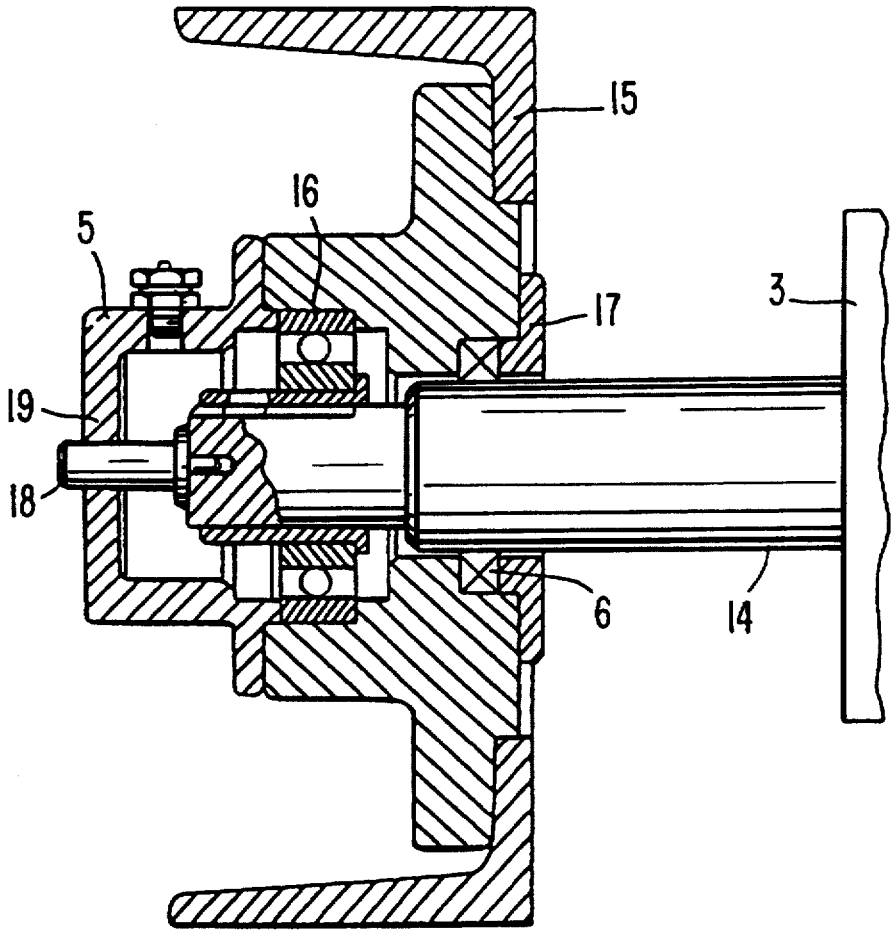
FIG. 6 is a partially sectioned elevational view, showing the detail of the support particularly designed for the rollers bearing the conveyor belt.

*As illustrated in FIGS. 1 and 2, a cyclically operated valve 60 is located downstream of (that is, below) the area of ash discharge from the boiler, between the load bearing run and the return run of belt 2. Valve 60 may be operated to deliver air to the boiler countercurrently to the direction of ash discharge from the boiler.*

It is of course to be understood that the foregoing detailed description was merely given as a non limiting example and therefore many modifications, additions, substitutions and/or variations may be resorted to the apparatus and process of the present invention, which was described in its particular embodiment for steam producing boilers in thermoelectric power plants, but obviously having a much broader range of application, which may be of interest in all those plants where there is the problem of discharging heavy and hot ash, without departing however from spirit and scope of the invention, as it is better defined in the appended claims.

I claim:

1. A system for continuously removing bottom ash from a [fire bed] *fired boiler*, said system comprising a [first and] flexible conveyor belt made of high temperature resistant material trained over a drive drum with a friction fit therebetween, a plurality of overlapping load bearing plates loosely joined to said conveyor belt for bearing the weight of a load deposited on said belt, whereby temperature caused expansion and contraction of said conveyor belt is absorbed by said plates sliding relative to each other in said overlap area, and a tightly sealed envelope means surrounding said conveyor belt in order to retain heat of said [fire bed] *fired boiler* while enabling said ash to be conveyed out of a [furnace in which said fire bed is located] *combustion chamber of said fired boiler.*

2. The system of claim 1 wherein said conveyor belt is a woven wire belt.

[3. The system of claim 2 and means down stream of said conveyor for cyclically discharging ash from said conveyor belt while precluding an escape of a significant amount of heat from said envelope means.]

4. The system of claim [3 and means wherein said downstream means returns] *2 including valve means, located in said envelope means, for returning* air to said [fire bed] *fired boiler*, the returned air passing over said conveyor belt in order to recapture heat from said hot ash, said heat being returned to said [fire bed] *fired boiler* when said returning air reaches said [furnace in which said fire bed is located] *combustion chamber.*

[5. The system of claim 1 and means at fire bed for continuously depositing hot ash on said conveyor belt.]

6. The system of claim 1 wherein said overlapping plates form a trough [under said flexible] *over a load bearing run of said conveyor* belt.

7. The system of claim 1 wherein said conveyor belt is a woven wire belt and said loosely joined plates are connected to said woven wire belt by bolts or rivets which are free to slide and move within the weave of said woven wire.

8. The system of claim 7 wherein said woven wire belt includes a plurality of cross pieces slipped into the weave of said woven wire, said bolts or rivets being joined to said crosspieces.

9. The system of claim 1 [and a second] *including a* guide drum, said conveyor belt being trained over said [second] guide drum, and means for adjusting [the] *a* position of said [second] guide drum to tension said conveyor belt.

10. The system of claim 1 [and] *including* a plurality of rollers for supporting said conveyor belt and said plates, said rollers *having ends* extending outwardly from said conveyor belt to an area which is much cooler than said ash, and bearing means for supporting the ends of said rollers.

*11. The system of claim 1, wherein the conveyor belt receives the ash discharged from the boiler in a first direction;*

*and wherein the system further comprises*

*a cyclically activated valve, located in the envelope means downstream from an area where the ash is received onto the conveyor belt, for controlling entrance of cool air and for delivering the cool air controlled by the valve in a second direction countercurrent with respect to the first direction of ash discharge so that heat yielded to the air by the ash and by combustion of unburnt matter on the conveyor belt is returned into the boiler so as to increase its efficiency.*

* * * * *